United States Patent
Yoshida et al.

(10) Patent No.: US 9,479,228 B2
(45) Date of Patent: Oct. 25, 2016

(54) UNIT DEVICE AND WIRELESS POWER SUPPLY INFORMATION PROVIDING SYSTEM

(71) Applicant: DENSO CORPORATION, Kariya, Aichi-pref. (JP)

(72) Inventors: Ichiro Yoshida, Takahama (JP); Kiyohiko Sawada, Nagoya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/767,696

(22) PCT Filed: Feb. 12, 2014

(86) PCT No.: PCT/JP2014/000706
§ 371 (c)(1),
(2) Date: Aug. 13, 2015

(87) PCT Pub. No.: WO2014/132580
PCT Pub. Date: Sep. 4, 2014

(65) Prior Publication Data
US 2015/0381240 A1 Dec. 31, 2015

(30) Foreign Application Priority Data
Feb. 28, 2013 (JP) ................. 2013-038984

(51) Int. Cl.
*H04B 5/00* (2006.01)
*H02J 50/80* (2016.01)
(Continued)

(52) U.S. Cl.
CPC ............. *H04B 5/0037* (2013.01); *G09F 9/00* (2013.01); *G09F 9/40* (2013.01); *G09G 3/2088* (2013.01);
(Continued)

(58) Field of Classification Search
CPC ...... H04B 5/0037; H02J 50/80; H02J 50/90; H02J 50/10; H02J 5/005; H02J 17/00; G09F 9/00; G09F 9/40; G09G 3/2088; H05B 37/0272
USPC ........................................................ 315/294
See application file for complete search history.

(56) References Cited

U.S. PATENT DOCUMENTS 9,049,753 B1 * 6/2015 Wassel ............... H05B 37/02
9,357,621 B2 * 5/2016 Lim .................... H05B 37/02
(Continued)

FOREIGN PATENT DOCUMENTS

| JP | 2005-018002 | 1/2005 |
|----|-------------|--------|
| JP | 2005-071853 | 3/2005 |

(Continued)

OTHER PUBLICATIONS

U.S. Appl. No. 14/420,693, filed Feb. 10, 2015, Yoshida et al.
(Continued)

*Primary Examiner* — Dylan White
(74) *Attorney, Agent, or Firm* — Posz Law Group, PLC

(57) ABSTRACT

In a unit device, a setup unit sets arrangement information, which indicates the position of each unit device in a state where a plurality of unit devices configure a unit device group, according to a sequence that conforms to the arrangement information of adjacent devices after the aforementioned group is configured. A storage unit stores the arrangement information configured by the setup unit. A provision control unit specifies the content of the information providing command, and by collating the content of the specified information providing command with the arrangement information stored in the storage unit, provides either of at least two or more states by means of a provision unit.

9 Claims, 13 Drawing Sheets

(51) Int. Cl.
*H02J 50/90* (2016.01)
*H02J 50/10* (2016.01)
*H02J 5/00* (2016.01)
*G09F 9/00* (2006.01)
*G09F 9/40* (2006.01)
*G09G 3/20* (2006.01)
*H05B 37/02* (2006.01)
*H02J 17/00* (2006.01)
*G06F 3/14* (2006.01)

(52) U.S. Cl.
CPC ............... *H02J 5/005* (2013.01); *H02J 17/00* (2013.01); *H02J 50/10* (2016.02); *H02J 50/80* (2016.02); *H02J 50/90* (2016.02); *H05B 37/0272* (2013.01); *G06F 3/1446* (2013.01); *G09G 2330/02* (2013.01); *G09G 2356/00* (2013.01); *G09G 2360/141* (2013.01); *G09G 2370/16* (2013.01)

(56) References Cited

U.S. PATENT DOCUMENTS

| | | | |
|---|---|---|---|
| 2009/0243397 A1 | 10/2009 | Cook et al. | |
| 2009/0290332 A1 | 11/2009 | Jacobs et al. | |
| 2010/0141153 A1* | 6/2010 | Recker | H05B 33/0803 315/149 |
| 2011/0310621 A1* | 12/2011 | Van Der Stok | H05B 37/0272 362/311.12 |
| 2013/0221915 A1* | 8/2013 | Son | H02J 7/025 320/108 |
| 2013/0342025 A1 | 12/2013 | Cook et al. | |
| 2015/0130285 A1* | 5/2015 | Leabman | H01F 38/14 307/104 |
| 2015/0296599 A1* | 10/2015 | Recker | H05B 37/0272 315/153 |
| 2016/0054396 A1* | 2/2016 | Bell | G01R 31/40 324/764.01 |
| 2016/0085281 A1* | 3/2016 | Tanabe | H04W 4/008 713/310 |
| 2016/0149442 A1* | 5/2016 | Asanuma | H02J 50/60 307/104 |

FOREIGN PATENT DOCUMENTS

| | | |
|---|---|---|
| JP | 2008-164986 | 7/2008 |
| JP | 2011-257540 | 12/2011 |
| JP | 2012-083403 | 4/2012 |
| WO | 2014/041729 | 3/2014 |

OTHER PUBLICATIONS

International Search Report and Written Opinion dated May 20, 2014 in the corresponding International Application No. PCT/JP2014/000706 (with English translation).

* cited by examiner

FIG. 9

| INITIAL ID | TWO-DIMENSIONAL COORDINATE |
|---|---|
| NNN | $(x_{a1}, y_{a1})$ |
| NNN | $(x_{a2}, y_{a2})$ |
| NNN | $(x_{a3}, y_{a3})$ |
| NNN | $(x_{a4}, y_{a4})$ |
| NNN | $(x_{a5}, y_{a5})$ |
| NNN | $(x_{a6}, y_{a6})$ |
| ⋮ | ⋮ |

FIG. 12
TURN ON UNIT DEVICE AT (1, 1)
| ON | DETECTED | | |
|---|---|---|---|
| DETECTED | | | |
| | | | |
| | | | |
TURN ON UNIT DEVICES AT (2, 1) AND (1, 2)
| INITIAL ID CORRELATED WITH ARRANGEMENT ID (1, 1) | ON | DETECTED | |
|---|---|---|---|
| ON | DETECTED | | |
| DETECTED | | | |
| | | | |
TURN ON UNIT DEVICES AT (3, 1), (2, 2), AND (1, 3)
| INITIAL ID CORRELATED WITH ARRANGEMENT ID (1, 1) | INITIAL ID CORRELATED WITH ARRANGEMENT ID (2, 1) | ON | DETECTED |
|---|---|---|---|
| INITIAL ID CORRELATED WITH ARRANGEMENT ID (1, 2) | ON | DETECTED | |
| ON | DETECTED | | |
| DETECTED | | | |

FIG. 13

| INITIAL ID (NNN) ARRANGEMENT ID (1, 1) | INITIAL ID (NNN) ARRANGEMENT ID (2, 1) | INITIAL ID (NNN) ARRANGEMENT ID (3, 1) | INITIAL ID (NNN) ARRANGEMENT ID (4, 1) | ... | INITIAL ID (NNN) ARRANGEMENT ID (m, 1) |
|---|---|---|---|---|---|
| INITIAL ID (NNN) ARRANGEMENT ID (1, 2) | INITIAL ID (NNN) ARRANGEMENT ID (2, 2) | INITIAL ID (NNN) ARRANGEMENT ID (3, 2) | INITIAL ID (NNN) ARRANGEMENT ID (4, 2) | ... | INITIAL ID (NNN) ARRANGEMENT ID (m, 2) |
| INITIAL ID (NNN) ARRANGEMENT ID (1, 3) | INITIAL ID (NNN) ARRANGEMENT ID (2, 3) | INITIAL ID (NNN) ARRANGEMENT ID (3, 3) | INITIAL ID (NNN) ARRANGEMENT ID (4, 3) | ... | INITIAL ID (NNN) ARRANGEMENT ID (m, 3) |
| INITIAL ID (NNN) ARRANGEMENT ID (1, 4) | INITIAL ID (NNN) ARRANGEMENT ID (2, 4) | INITIAL ID (NNN) ARRANGEMENT ID (3, 4) | INITIAL ID (NNN) ARRANGEMENT ID (4, 4) | ... | INITIAL ID (NNN) ARRANGEMENT ID (m, 4) |
| ... | ... | ... | ... | ... | ... |
| INITIAL ID (NNN) ARRANGEMENT ID (1, n) | INITIAL ID (NNN) ARRANGEMENT ID (2, n) | INITIAL ID (NNN) ARRANGEMENT ID (3, n) | INITIAL ID (NNN) ARRANGEMENT ID (4, n) | ... | INITIAL ID (NNN) ARRANGEMENT ID (m, n) |

FIG. 15

| INITIAL ID | TWO-DIMENSIONAL COORDINATE |
|---|---|
| NNN | $(x_{b1}, y_{b1})$ |
| NNN | $(x_{b2}, y_{b2})$ |
| NNN | $(x_{b3}, y_{b3})$ |
| NNN | $(x_{b4}, y_{b4})$ |
| NNN | $(x_{b5}, y_{b5})$ |
| NNN | $(x_{b6}, y_{b6})$ |
| ⋮ | ⋮ |

UNIT DEVICE AND WIRELESS POWER SUPPLY INFORMATION PROVIDING SYSTEM

CROSS REFERENCE TO RELATED APPLICATIONS

This application is a U.S. national stage of International Application No. PCT/JP2014/000706 filed on Feb. 12, 2014 and is based on Japanese Patent Application No. 2013-38984 filed on Feb. 28, 2013, the disclosures of which are incorporated herein by reference.

TECHNICAL FIELD

The present disclosure relates to a wireless power supply information providing system that includes a unit device, a unit device group including a combination of several unit devices, and a controller.

BACKGROUND ART

Conventionally, an electric wire is used as a means to supply the electric power to various devices in many places. When an electric wire is used to increase the number of devices to which the power is supplied, a power supply tap is used as an extension from a receptacle outlet installed at a wall. The electric power is supplied via the power supply tap. However, the use of the power supply tap causes many issues from the viewpoint of wiring work or accident prevention. Recently, several systems have been put into practice for efficiently supplying the electric power using an electromagnetic wave for a relatively long distance. Patent literature 1 discloses the technology that wirelessly supplies the electric power to an optical module and configures an illumination system.

The technology disclosed in patent literature 1 provides a base unit with several primary coils and provides several secondary coils and optical modules corresponding to the primary coils. The primary coil is wirelessly powered from the outside to energize the primary coil. A magnetic field resonance occurs between the energized primary coil and a secondary coil corresponding to the primary coil. The secondary coil supplies the power to an optical module to operate the optical module (to emit light). The illumination system disclosed in patent literature 1 operates the optical module but is not designed to display information such as letters or images. The illumination system does not require too many optical modules and does not require much work to place a limited number of optical modules. However, many optical modules may be needed to control on/off states of many optical modules to display information. Much work may be required to place many optical modules.

An attempt to control on/off states of many optical modules and to display information requires managing positions (i.e., addresses) of optical modules and individually controlling on/off states of respective optical modules. In this case, each optical module needs to be previously given position information (address information such as two-dimensional coordinates of two-dimensionally arranged optical modules). However, intended information cannot be displayed if optical modules are arranged based on incorrect position information. Establishment of such system requires time-consuming work such as individually confirming the position information given to each optical module to be arranged.

PRIOR ART LITERATURES

Patent Literature

Patent Literature 1: Japanese Translation of PCT International Application Publication No. 2009-545103 (corresponding to U.S. Pat. No. 7,909,483)

SUMMARY OF INVENTION

An object of the present disclosure is to provide a unit device and a wireless power supply information providing system capable of easily arranging a unit device and appropriately providing information when several unit devices are combined to establish the wireless power supply information providing system that provides information such as letters or images based on wireless power supply.

Several unit devices according to a first embodiment of the disclosure are combined to configure a unit device group. The unit device includes a power receiving unit, a state provision unit, a setup unit, a storage unit, and a provision control unit. The power receiving unit wirelessly receives electric power from the outside. The state provision unit can selectively provide at least two states based on the power received by the power receiving unit. Arrangement information indicates positions of respective unit devices included in the unit device. After the unit device group is configured, the setup unit sets the arrangement information in the order corresponding to the arrangement information about an adjacent unit device. The storage unit stores the arrangement information set by the setup unit. The provision control unit specifies content of an information provision instruction. The provision control unit collates the specified content of the information provision instruction with the arrangement information stored in the storage unit and thereby allows the state provision unit to display a relevant state.

Unlike the prior art, the arrangement of the unit devices according to the first embodiment does not require a time-consuming process of confirming position information given to the unit device to be arranged. The unit devices can be arranged easily. Each of the unit devices provides a corresponding state based on the arrangement information about the unit device itself. A combination of the unit devices enables to appropriately provide information.

A wireless power supply information providing system according to a second embodiment of the disclosure includes a unit device group including the combined unit devices according to the first embodiment and a controller. The controller specifies a reference position corresponding to a position of one of the unit devices. The controller determines arrangement information about all unit devices in an alignment sequence of relative positions with reference to arrangement information about a unit device corresponding to the reference position. The controller notifies the determined arrangement information to each of the unit devices. Each of the unit devices is notified of arrangement information from the controller and sets arrangement information about the unit device itself.

A wireless power supply information providing system according to a third embodiment of the disclosure includes a unit device group including the combined unit devices according to the first embodiment and a controller. The controller determines arrangement information about all unit devices in an alignment sequence of absolute positions and notifies the determined arrangement information to each of the unit devices. Each of the unit devices is notified of arrangement information from the controller and sets arrangement information about the unit device itself.

BRIEF DESCRIPTION OF DRAWINGS

The above and other objects, features and advantages of the present disclosure will become more apparent from the following detailed description made with reference to the accompanying drawings. In the drawings:

FIG. 9 is a diagram illustrating correspondence between an initial ID and a two-dimensional coordinate;

FIG. 12 is a diagram illustrating a mode to detect a light-on condition;

FIG. 13 is a diagram illustrating correspondence between an initial ID and an arrangement ID;

FIG. 15 is a diagram illustrating correspondence between an initial ID and a two-dimensional coordinate.

EMBODIMENTS FOR CARRYING OUT INVENTION

Figure 1:
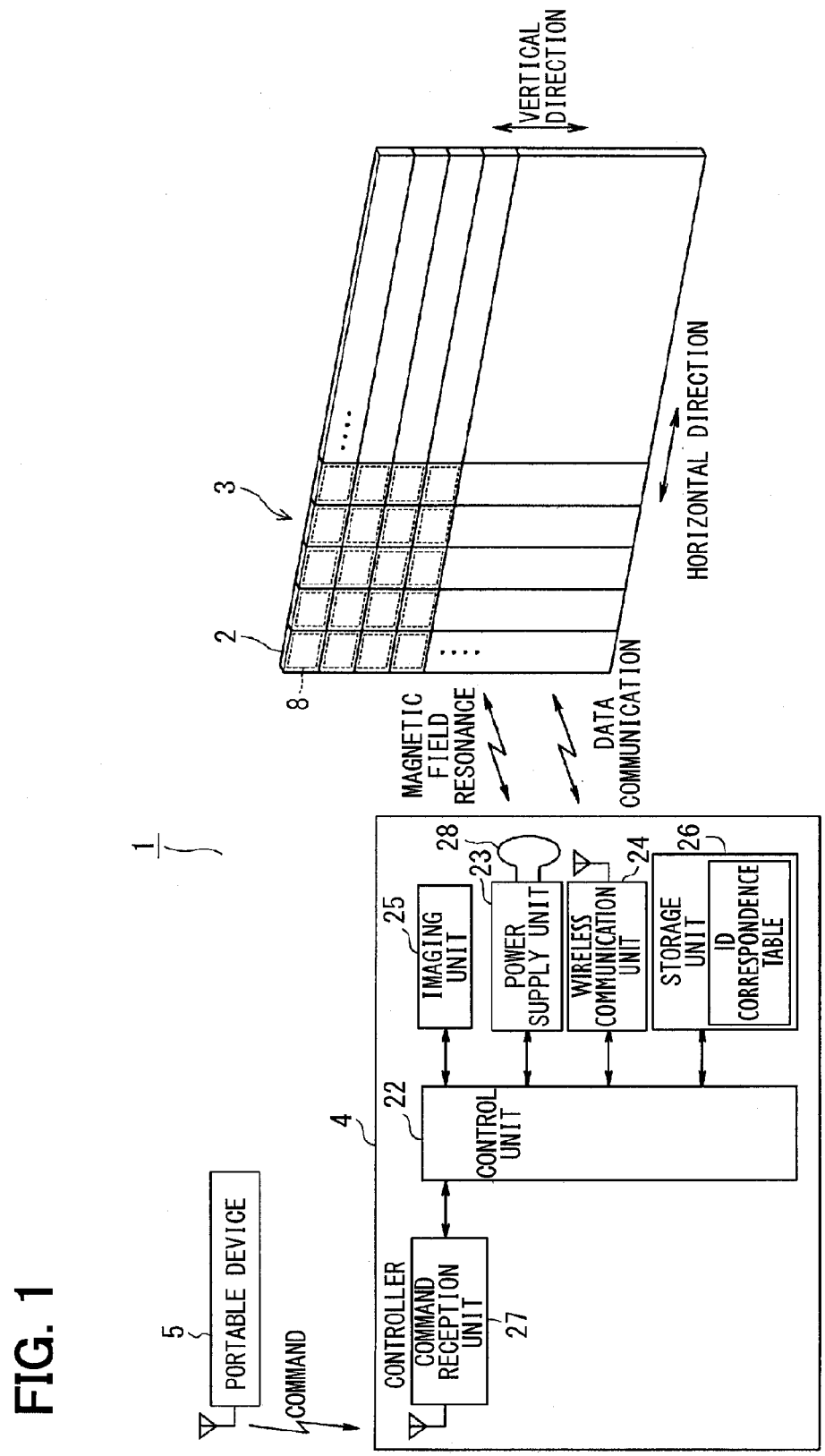
FIG. 1 is a function block diagram illustrating a wireless power supply information providing system according to an embodiment of the disclosure.

The following describes an embodiment of the disclosure with reference to accompanying drawings. A wireless power supply information providing system 1 includes a unit device 2, a unit device group 3, a controller (i.e., external device) 4, and a portable device 5. The unit device group 3 includes the unit devices 2 that are arranged two-dimensionally (i.e., horizontally and vertically) and regularly. A user can carry and manipulate the portable device 5. The wireless power supply information providing system 1 is arranged indoor, for example.

Figure 2:
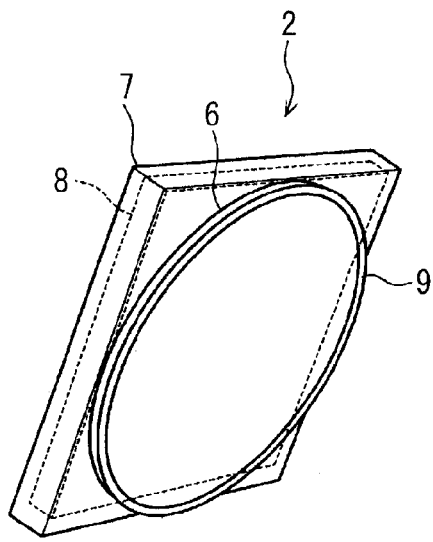
FIG. 2 is a perspective diagram viewed from the rear side of a unit device.
Figure 3:
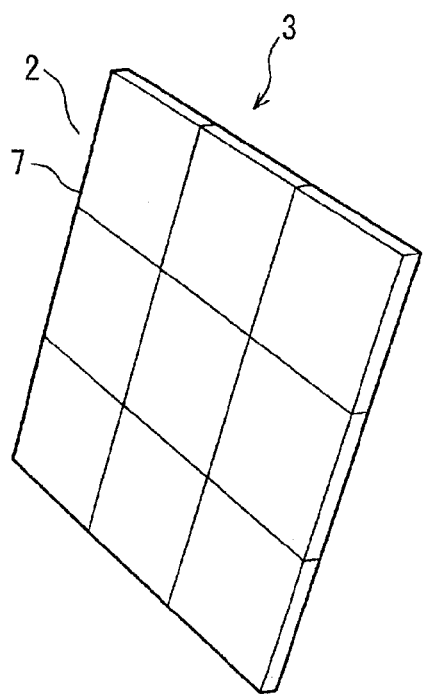
FIG. 3 is a perspective diagram viewed from the front side of a unit device.
Figure 4:
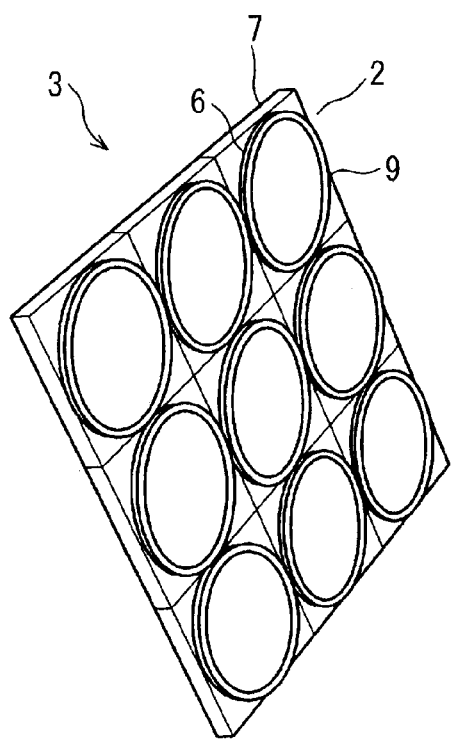
FIG. 4 is a perspective diagram viewed from the rear side of a unit device group.

As illustrated in FIG. 2, the unit device 2 includes a combination of a circular and flat substrate 6 and a rectangular (almost square) and flat light guide plate 7 that overlap with each other. The light guide plate 7 includes a light-emitting unit 8. The light-emitting unit 8 exemplifies a state provision unit, a light-emitting unit, and a display unit. The substrate 6 includes an annular power receiving coil 9 to follow an external shape of the substrate 6. As illustrated in FIGS. 3 and 4, the unit device group 3 includes two-dimensionally arranged unit devices 2 and functions as a pixel while each unit device 2 toggles between a light-on condition and a light-off condition. The unit device group 3 can display information (letters or images). FIGS. 3 and 4 illustrate arrangement of "3×3" unit devices 2. The unit device group 3 includes 1024 horizontally arranged unit devices 2 and 768 vertically arranged unit devices 2. The unit device group 3 is comparable to a display screen (flat display device) featuring the resolution of 1024×768. The number of combined unit devices 2 determines a resolution.

Figure 5:
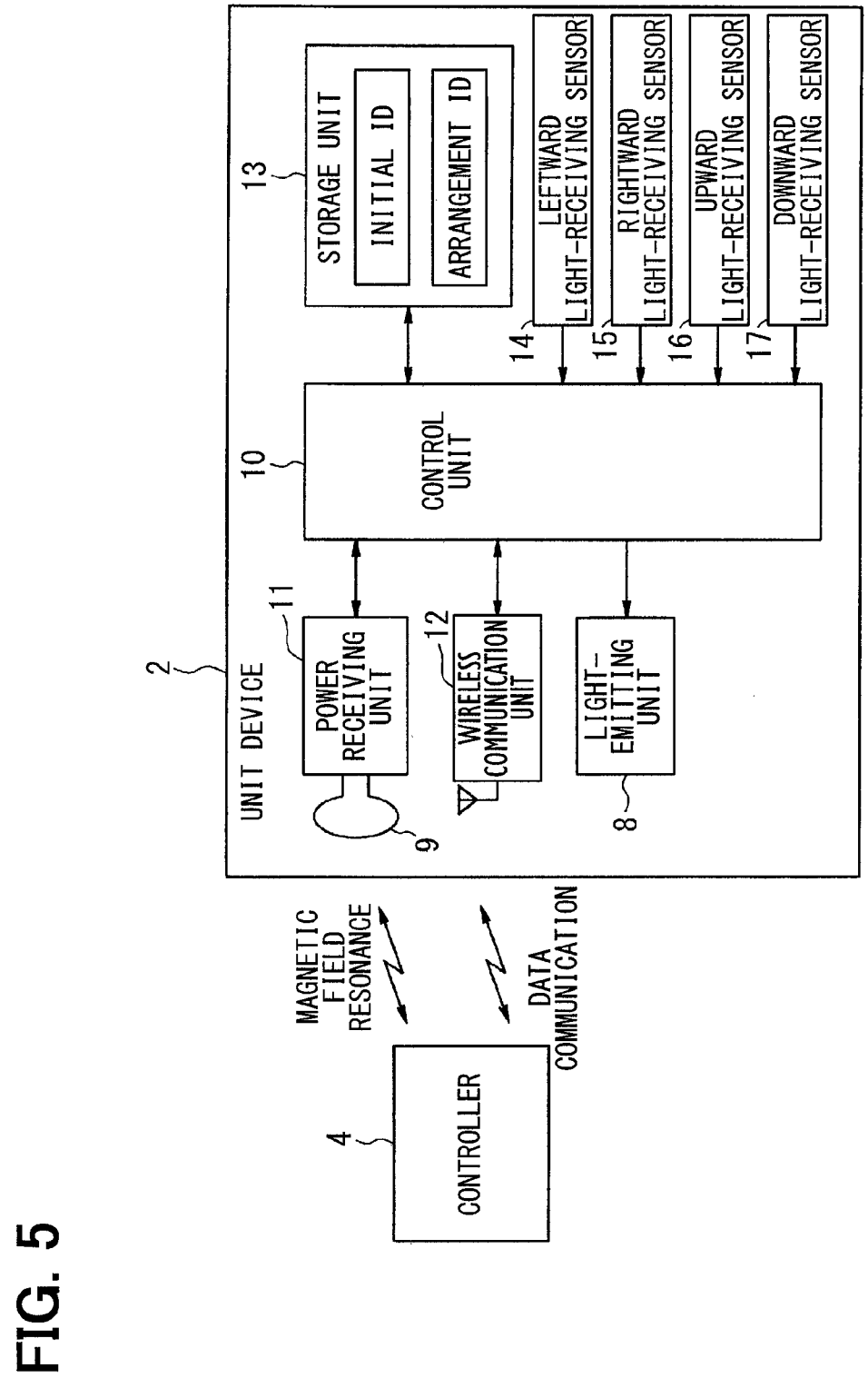
FIG. 5 is a function block diagram illustrating a unit device.

As an electric configuration illustrated in FIG. 5, the unit device 2 includes a control unit 10, a power receiving unit 11, the light-emitting unit 8, a wireless communication unit 12, a storage unit 13, a leftward light-receiving sensor 14, a rightward light-receiving sensor 15, an upward light-receiving sensor 16, and a downward light-receiving sensor 17. The control unit 10 is configured as a known microcomputer including a CPU, RAM, ROM, and an I/O bus. The control unit 10 performs a computer program stored in the ROM to control overall operation of the unit device 2 such as power receiving control, data communication control, and storage control. The control unit 10 exemplifies a setup unit and a provision control unit.

The power receiving unit 11 includes the power receiving coil 9 and a power receiving capacitor (not shown). The power receiving unit 11 performs magnetic field resonance with a power supply unit 23 in the controller 4 to be described later. The magnetic field resonance generates a high-frequency wave. The power receiving unit 11 rectifies the high-frequency wave to transform it into a direct current and generate the electric power. The power receiving unit 11 supplies each function block with the generated electric power as operating electric power for the unit device 2. The embodiment uses a magnetic field resonance technique that uses the magnetic field resonance to supply the electric power. Available techniques include a radio wave technique that supplies the electric power as an electromagnetic wave, an electromagnetic induction technique that supplies the electric power using an inductive magnetic flux as a medium, and an electric field coupling technique that supplies the electric power using an electric field. The embodiment may use any technique that wirelessly (without making contact) supplies the electric power.

The wireless communication unit 12 performs data communication with a wireless communication unit 24 in the controller 4 (to be described) according to Near Field Communication (such as Bluetooth (registered trademark) and wireless LAN). The storage unit 13 can store an initial ID (i.e., initial information) and an arrangement ID (i.e., arrangement information) in its storage area. The initial ID is a fixed value given as a unique ID stored while the unit device 2 is manufactured. The control unit 10 can output a read instruction to the storage unit 13 and read the initial ID from the storage unit 13. The arrangement ID is a variable value given as a unique ID that can be written as needed. The control unit 10 can output a write instruction to the storage unit 13 and write the arrangement ID to the storage unit 13. According to the embodiment, the unit devices 2 are two-dimensionally combined and the arrangement ID is given as a two-dimensional coordinate (or a value representing the two-dimensional coordinate).

Figure 6:
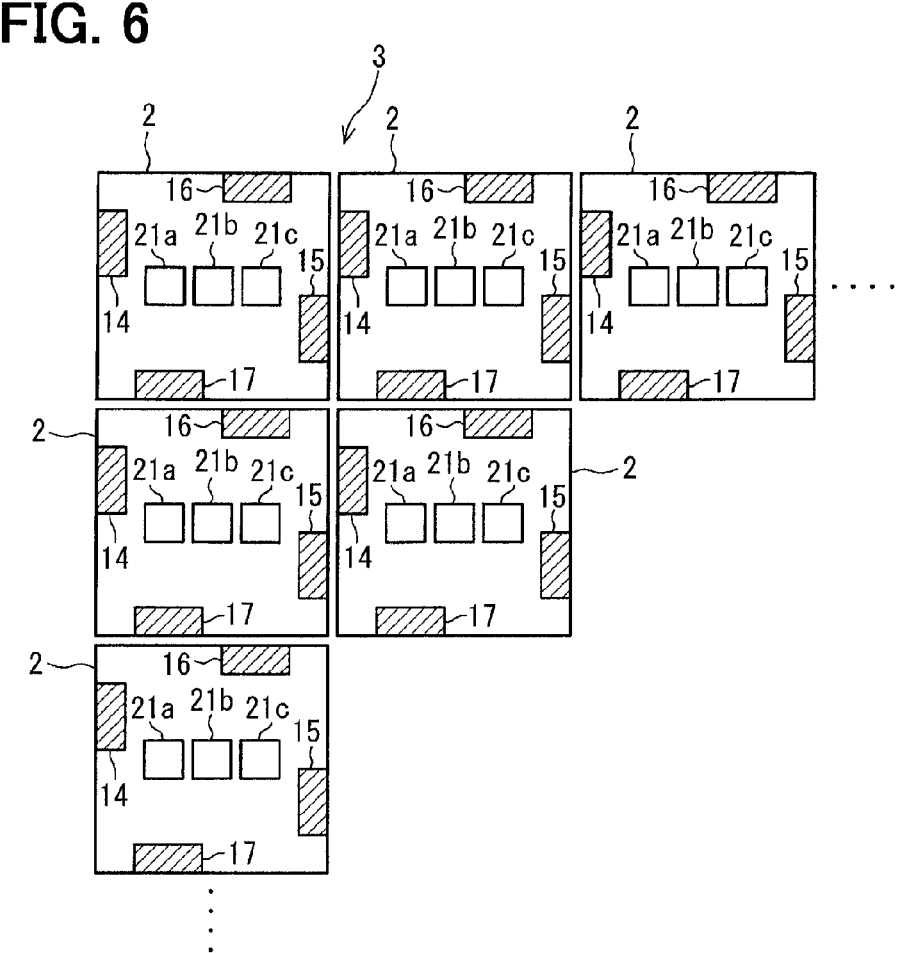
FIG. 6 is a diagram illustrating arrangement of unit devices.
Figure 7:
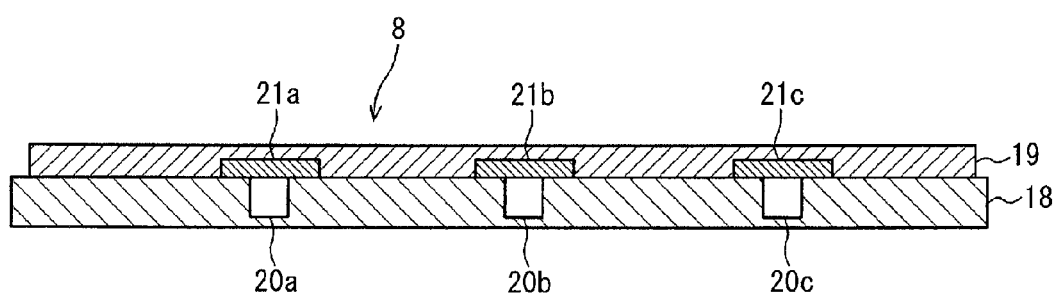
FIG. 7 is a sectional view of a light-emitting unit.
Figure 8:
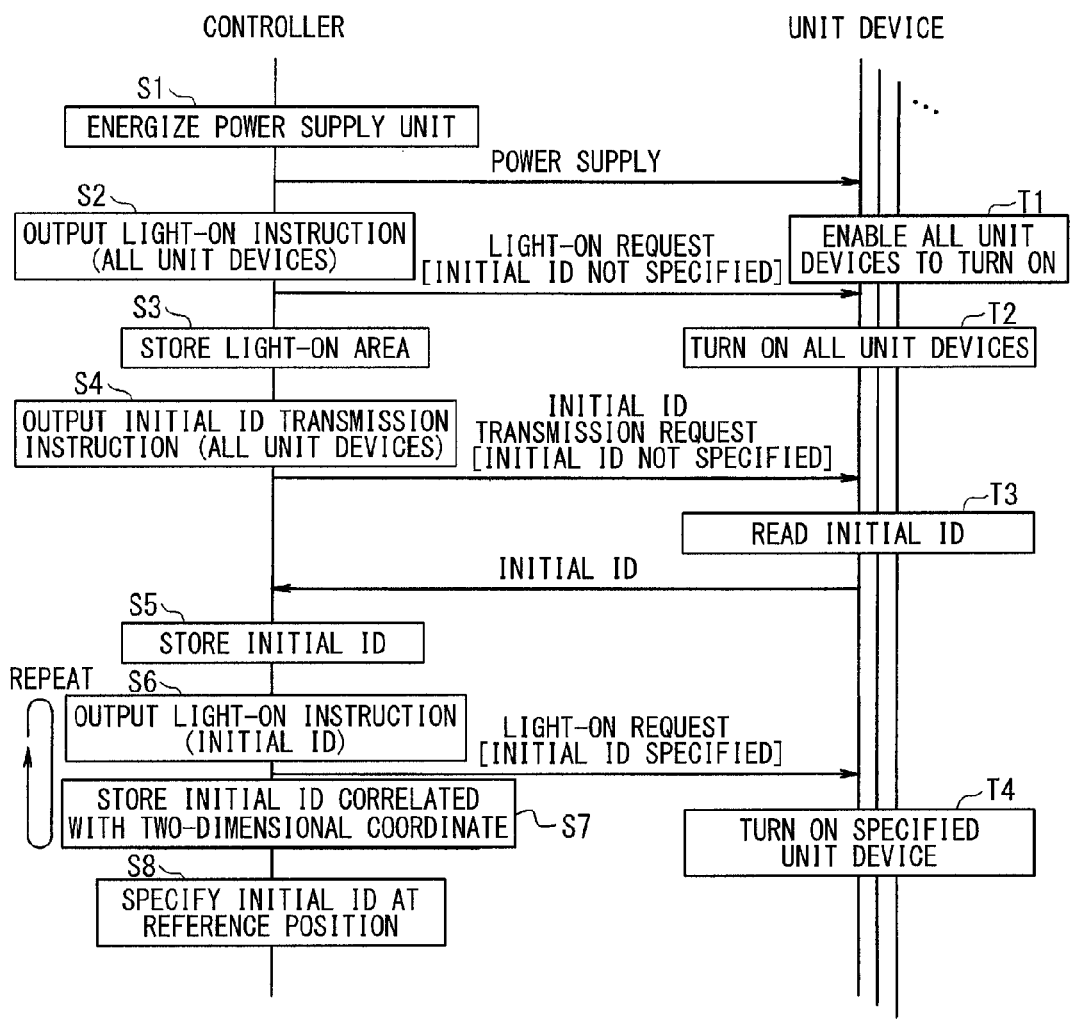
FIG. 8 is a sequence diagram illustrating processes performed by a controller and a unit device.
Figure 10:
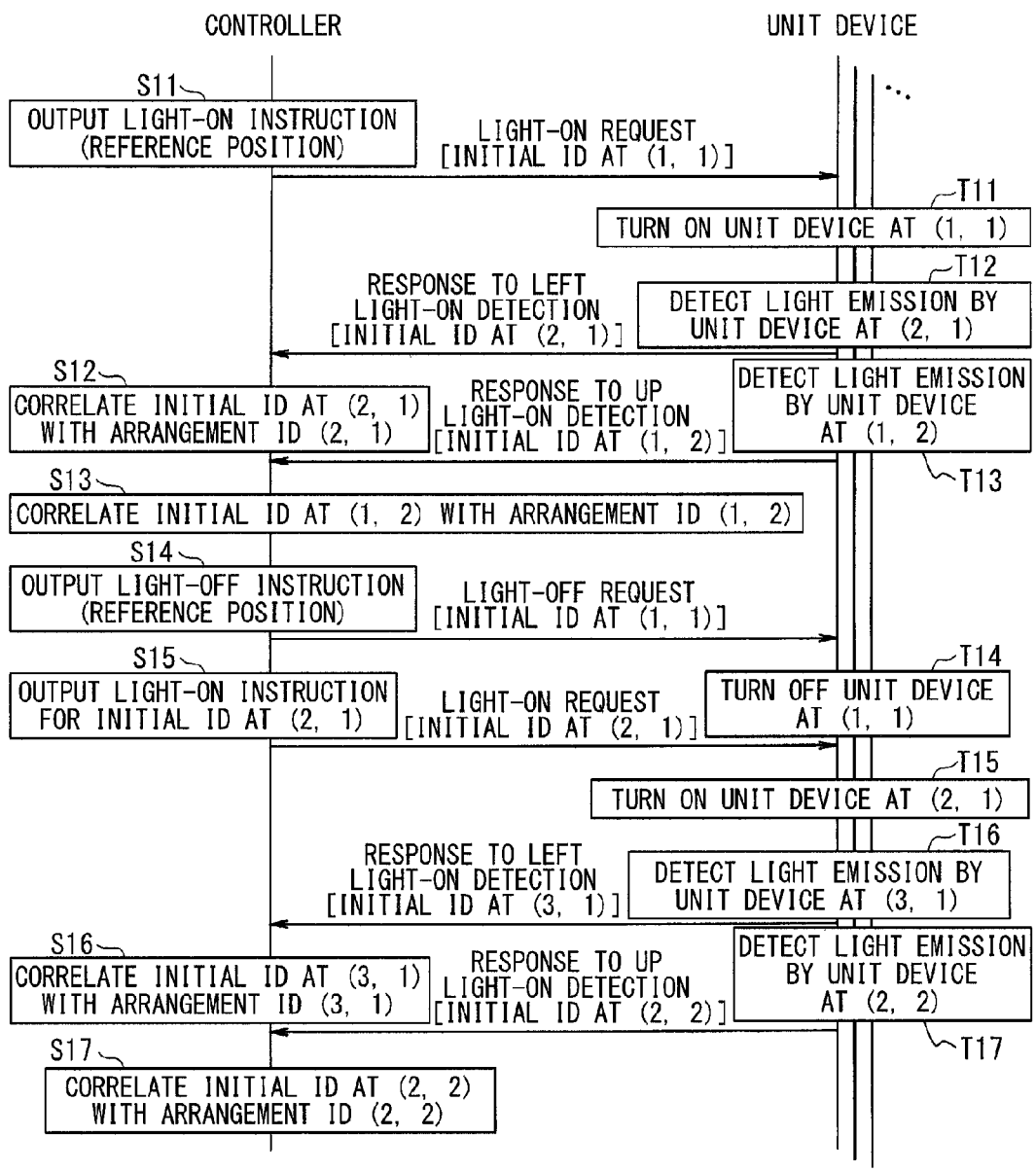
FIG. 10 is a sequence diagram illustrating processes performed by the controller and the unit device.
Figure 11:
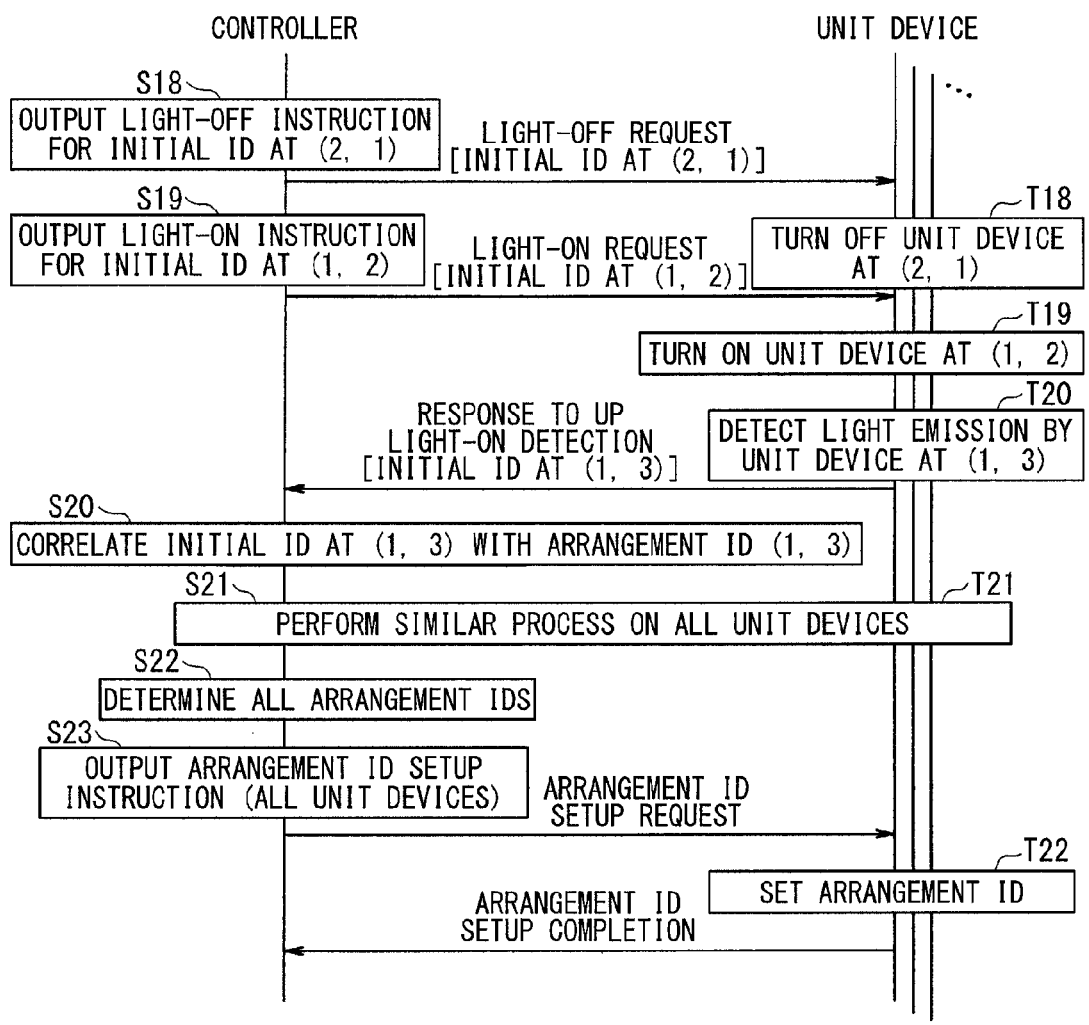
FIG. 11 is a sequence diagram illustrating processes performed by the controller and the unit device.
Figure 14:
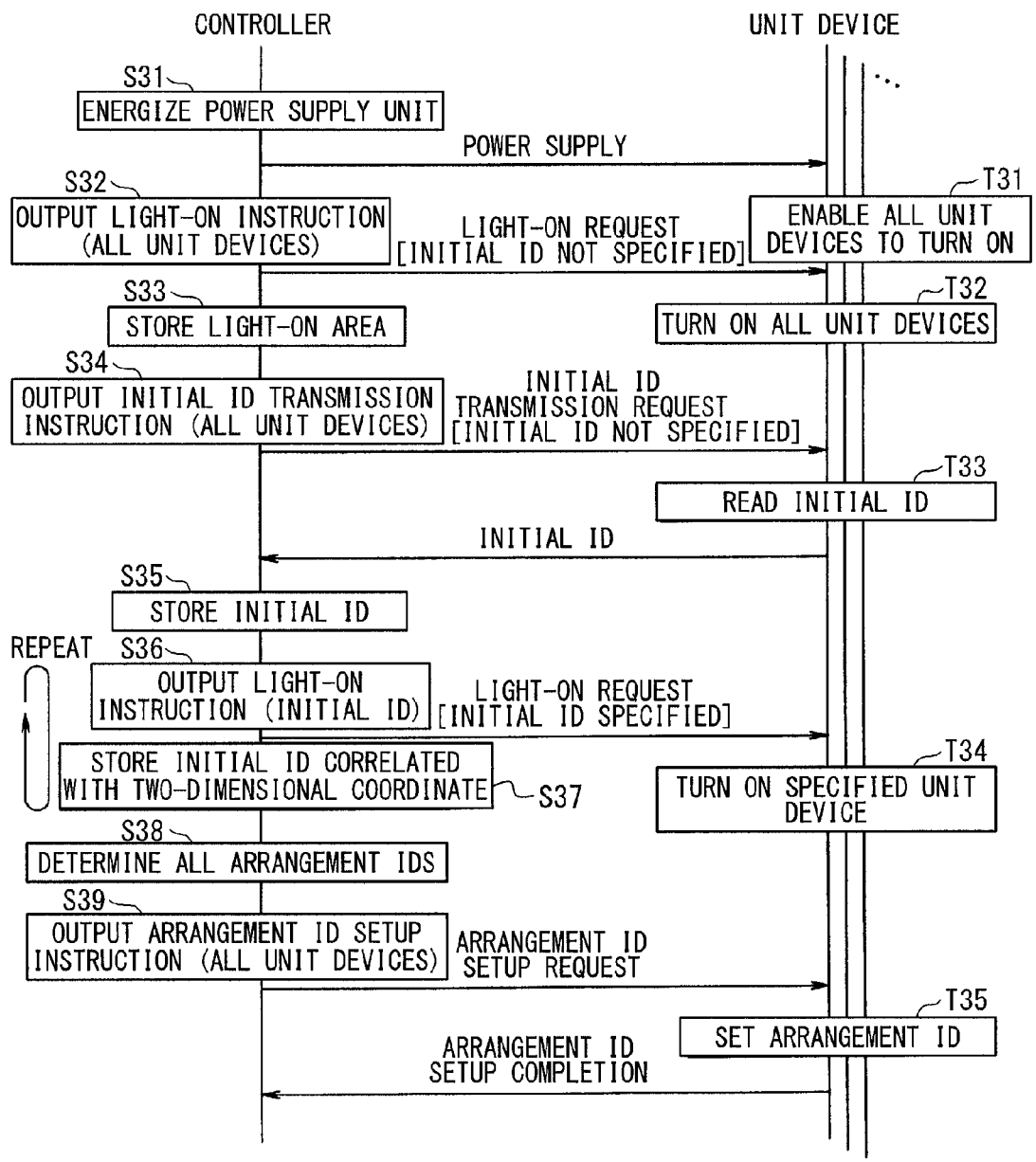
FIG. 14 is a sequence diagram illustrating processes performed by the controller and the unit device.

The leftward light-receiving sensor 14 is provided so as to be capable of detecting light emission of the unit device 2 that is adjacently arranged to the left of the leftward light-receiving sensor 14 itself viewed from the front (the surface where the light-emitting unit 8 is activated). When detecting light emission, the leftward light-receiving sensor 14 outputs a detection signal to the control unit 10. The rightward light-receiving sensor 15 is provided so as to be capable of detecting light emission of the unit device 2 that is adjacently arranged to the right of the rightward light-receiving sensor 15 itself viewed from the front. When detecting light emission, the rightward light-receiving sensor 15 outputs a detection signal to the control unit 10. The upward light-receiving sensor 16 is provided so as to be capable of detecting light emission of the unit device 2 that is adjacently arranged above the rightward light-receiving sensor 15 itself viewed from the front. When detecting light emission, the upward light-receiving sensor 16 outputs a detection signal to the control unit 10. The downward light-receiving sensor 17 is provided so as to be capable of detecting light emission of the unit device 2 that is adjacently arranged to the bottom of the rightward light-receiving sensor 15 itself viewed from the front. When detecting light emission, the downward light-receiving sensor 17 outputs a detection signal to the control unit 10. The unit device 2 contains printed or stamped marks to indicate the left, right, top and bottom orientations. As illustrated in FIG. 6, a worker can combine the unit devices 2 with reference to the light-receiving sensors 14 through 17 corresponding to the left, right, top and bottom orientations of the unit device 2 according to the marks. The worker can position the leftward light-receiving sensor 14 to the left viewed from the front.

The light-emitting unit 8 includes a combination of a semiconductor substrate 18 and a light diffusion layer 19 that overlap with each other. The semiconductor substrate 18 includes three LEDs 20a through 20c. The light diffusion layer 19 includes a red filter 21a, a green filter 21b, and a blue filter 21c corresponding to the three LEDs 20a through 20c. The control unit 10 individually controls light-on and light-off conditions of the three LEDs 20a through 20c. The control unit 10 also individually controls the light transmission amount of the red filter 21a, the green filter 21b, and the blue filter 21c. The control unit 10 can represent many colors by varying the light transmission amount of the red filter 21a, the green filter 21b, and the blue filter 21c. The control unit 10 can represent 8×8×8=512 colors by varying light emission intensities of the LEDs 20a through 20c and thereby varying the light transmission amount of the red filter 21a, the green filter 21b, and the blue filter 21c at eight levels. The control unit 10 can represent 24-bit full color by controlling light emission intensities of the LEDs 20a through 20c corresponding to R, G, and B in eight bits.

The controller 4 is arranged to face the unit devices 2 so as to be capable of wireless power supply to each of the unit devices 2 included in the unit device group 3. The controller 4 includes a control unit 22, a power supply unit 23, a wireless communication unit 24, an imaging unit 25, a storage unit 26, and a command reception unit 27. The control unit 22 is configured as a known microcomputer including a CPU, RAM, ROM, and an I/O bus. The control unit 22 performs a computer program stored in the ROM to control overall operation of the controller 4 such as power supply control, data communication control, and command reception control.

The power supply unit 23 includes a power supply coil 28 and a power supply capacitor (not shown). The power supply unit 23 performs magnetic field resonance with the power receiving unit 11 in the unit device 2. The wireless communication unit 24 performs data communication with the wireless communication unit 12 in the unit device 2 according to Near Field Communication. The imaging unit 25 includes a charge-coupled device (CCD) sensor or a complementary metal oxide semiconducting (CMOS) sensor. The imaging unit 25 captures the whole of the unit device group 3 from the front and outputs the captured image to the control unit 22. The storage unit 26 stores an ID correspondence table that can specify correspondence between the initial ID and the arrangement ID of each unit device 2. The command reception unit 27 receives a command transmitted from the portable device 5 and outputs the command to the control unit 22. The control unit 22 receives the command from the command reception unit 27 and analyzes the command.

The portable device 5 is, for example, a mobile telephone or a mobile information terminal. The portable device 5 includes a function to accept user's command input manipulation and a function to transmit a command corresponding to the command input manipulation. The portable device 5 accepts a user's manipulation to input a command as an instruction to display information such as a letter or an image. The portable device 5 then transmits a command for the accepted display instruction to the controller 4. The controller 4 allows the command reception unit 27 to receive the command transmitted from the portable device 5. The controller 4 analyzes the received command to generate a control instruction. The wireless communication unit 24 transmits the generated control instruction to the unit device 2. The control instruction can specify a light-on or light-off condition of each unit device 2 (i.e., arrangement ID) or light emission amounts of the LEDs 20a through 20c.

Each unit device 2 allows the wireless communication unit 12 to receive the control instruction transmitted from the controller 4. The unit device 2 controls the light-on or light-off condition of the light-emitting unit 8 according to the received control instruction. The unit device 2 also controls the light emission amounts of the LEDs 20a through 20c. Specifically, the unit device 2 turns on the light-emitting unit 8 when the control instruction corresponding to the arrangement ID set by the unit device 2 specifies the light-on condition. The unit device 2 controls light emission amounts of the LEDs 20a through 20c. The unit device 2 turns off the light-emitting unit 8 when the control instruction corresponding to the arrangement ID set by the unit device 2 specifies the light-off condition. A procedure to set the arrangement ID will be described later.

The user may use the portable device 5 to enter a command corresponding to an instruction to display the information while each of the unit devices 2 included in the unit device group 3 sets the arrangement ID. In this state, each of the unit devices 2 controls the light-on or light-off condition of the light-emitting unit 8 based on the arrangement ID of the unit device 2 and controls the light emission amount of each of the LEDs 20a through 20c. Two-dimensionally combining the light-on or light-off condition and color representation can provide the information such as letters or images. Each of the unit devices 2 may be able to control the light-on or light-off condition of the light-emitting unit 8 and color representation in milliseconds. In such a case, the unit device 2 can change still pictures in milliseconds and provide the information as a motion picture.

Also with reference to FIGS. 8 through 15, the following describes a process performed by the control unit 22 of the controller 4 and a process performed by the control unit 10 of the unit device 2 as an effect of the configuration when the unit devices 2 are two-dimensionally arranged to form the unit device group 3. According to the configuration, the unit devices 2 are two-dimensionally combined to form the unit device group 3 (to randomly arrange the initial IDs). After this state, the arrangement ID needs to be set for each of the two-dimensionally combined unit devices 2. Setting the arrangement ID requires accurately specifying the position of the unit device 2. However, the position of the unit device 2 may or may not be accurately specified depending on a size of the pixel (the light-emitting unit 8 of the unit device 2) or an imaging capability of the imaging unit 25. The position of the unit device 2 in the unit device group 3 can be accurately specified when the pixel size is relatively large or the imaging capability of the imaging unit 25 is relatively high. The position of the unit device 2 in the unit device group 3 cannot be accurately specified when the pixel size is relatively small or the imaging capability of the imaging unit 25 is relatively low. The following describes a process (first arrangement ID setup process) to set the arrangement ID when the position of the unit device 2 cannot be specified accurately and a process (second arrangement ID setup process) to set the arrangement ID when the position of the unit device 2 can be specified accurately in order.

(1) First Arrangement ID Setup Process

The first arrangement ID setup process sets the position of one of the unit devices 2 as a reference position. The first arrangement ID setup process finds a relative position with reference to the reference position and sets arrangement IDs for all the unit devices 2. The first arrangement ID setup process performs a reference position setup process to set the reference position and an arrangement ID setup process based on the reference position.

(1-1) Reference Position Setup Process

In the controller 4, the control unit 22 energizes the power supply unit 23. The control unit 22 allows the power supply unit 23 to perform magnetic field resonance with the power receiving units 11 of all the unit devices 2 included in the unit device group 3 and to supply the electric power to all the unit devices 2 (at S1). All the unit devices 2 perform the magnetic field resonance to generate an electric power and are enabled to turn on the light-emitting unit 8 (at T1). The control unit 22 outputs a light-on instruction targeted at all the unit devices 2 to the wireless communication unit 24. The control unit 22 allows the wireless communication unit 24 to transmit a light-on request [no initial ID specified] to all the unit devices 2 (at S2).

In the unit device 2, the control unit 10 allows the wireless communication unit 12 to receive the light-on request [no initial ID specified] transmitted from the controller 4. The control unit 10 turns on the light-emitting unit 8 based on the received light-on request (at T2). In this case, the light-emitting units 8 of all the unit devices 2 turn on because the light-on request is targeted at all the unit devices 2.

In the controller 4, the control unit 22 activates the imaging unit 25 while the light-emitting units 8 of all the unit devices 2 turn on. The control unit 22 allows the imaging unit 25 to image the whole of the unit device group 3. The control unit 22 analyzes an image generated and captured by the imaging unit 25 and thereby specifies a light-on area where the light-emitting units 8 of all the unit devices 2 turn on. The control unit 22 allows the storage unit 26 to store the specified light-on area as a two-dimensional coordinate (at S3). The position of the unit device 2 in the unit device group 3 cannot be accurately specified when the pixel size is relatively small or the imaging capability of the imaging unit 25 is relatively low. In this case, the two-dimensional coordinate for the light-on area is inaccurate and does not conform to a regular sequence. The control unit 22 outputs an initial ID transmission instruction targeted at all the unit devices 2 to the wireless communication unit 24. The control unit 22 allows the wireless communication unit 24 to transmit an initial ID transmission request [no initial ID specified] to all the unit devices 2 (at S4).

In the unit device 2, the control unit 10 allows the wireless communication unit 12 to receive the initial ID transmission request [no initial ID specified] transmitted from the controller 4. The control unit 10 then outputs a read instruction to the storage unit 13 and reads the initial ID from the storage unit 13 (at T3). The control unit 10 allows the wireless communication unit 12 to transmit the read initial ID to the controller 4. In this case, all the unit devices 2 are allowed to transmit the initial IDs.

In the controller 4, the control unit 22 allows the wireless communication unit 24 to receive the initial IDs transmitted from all the unit devices 2. The control unit 22 allows the storage unit 26 to store the received initial IDs. Namely, the control unit 22 allows the storage unit 26 to store initial IDs as many as all the unit devices 2 included in the unit device group 3 (at S5). The control unit 22 reads the initial IDs one by one stored by the storage unit 26. The control unit 22 outputs a light-on instruction targeted at the read initial ID to the wireless communication unit 24. The control unit 22 allows the wireless communication unit 24 to transmit a light-on request [specified initial ID] to the unit device 2 (at S6).

In the unit device 2, the control unit 10 allows the wireless communication unit 12 to receive the light-on request [specified initial ID] transmitted from the controller 4. The control unit 10 turns on the light-emitting unit 8 based on the received light-on request (at T4). In this case, the control unit 10 turns on only the light-emitting unit 8 of the unit device 2 corresponding to the specified initial ID. The control unit 10 collates the initial ID specified by the received light-on request with the initial ID of the unit device 2. If both the initial IDs match, the control unit 10 turns on the light-emitting unit 8. Otherwise, the control unit 10 does not turn on the light-emitting unit 8.

In the controller 4, the control unit 22 analyzes an image generated and captured by the imaging unit 25 and thereby specifies the position of the unit device 2 allowing the light-emitting unit 8 to turn on while the light-emitting unit 8 of the specified unit device 2 turns on. As illustrated in FIG. 9, the control unit 22 correlates an initial ID with a two-dimensional coordinate ($x_{am}$, $y_{an}$), where m and n are natural numbers (at S7). The control unit 22 repeatedly performs the above-mentioned procedure on all the initial IDs. All the initial IDs can be correlated with two-dimensional coordinates. Two-dimensional coordinates correlated with all the initial IDs are less accurate and do not conform to a regular sequence. A regular sequence needs to be defined.

The control unit 22 correlates all the initial IDs with two-dimensional coordinates and then specifies an initial ID at the reference position (at S8). Suppose that the reference position is given at the top left of the unit device group 3 viewed from the front. The control unit 22 specifies an uppermost and leftmost two-dimensional coordinate out of the two-dimensional coordinates correlated with all the initial IDs. An initial ID corresponds to the specified uppermost and leftmost two-dimensional coordinate. The control unit 22 specifies this initial ID as the initial ID at the reference position. A two-dimensional coordinate at the top left is represented as a combination of the minimum x-coordinate and the minimum y-coordinate while the minimum x-coordinate and the minimum y-coordinate belong to x-coordinates and y-coordinates correlated with all the initial IDs. The two-dimensional coordinate is represented as (1, 1) if the minimum x-coordinate is 1 and the minimum y-coordinate is 1.

(1-2) Arrangement ID Setup Process Based on the Reference Position

Suppose the two-dimensional coordinate at the reference position is given as (1, 1). The control unit 22 in the controller 4 outputs a light-on instruction targeted at the unit device 2 corresponding to (1, 1), i.e., the two-dimensional coordinate at the reference position, to the wireless communication unit 24. The control unit 22 allows the wireless communication unit 24 to transmit a light-on request [initial ID at (1, 1)] to the unit device 2 (at S11).

In the unit device 2, the control unit 10 allows the wireless communication unit 12 to receive the light-on request [initial ID at (1, 1)] transmitted from the controller 4. The control unit 10 turns on the light-emitting unit 8 based on the received light-on request (at T11). The control unit 10 activates the light-emitting unit 8 of the unit device 2 arranged at coordinate (1, 1) as the reference position. The control unit 10 does not activate the light-emitting units 8 of the other unit devices 2.

The unit device 2 adjacent to the unit device 2 arranged at coordinate (1, 1) detects light emission from the light-emitting unit 8 of the unit device 2 arranged at coordinate (1, 1) as the reference position. The unit device 2 uses the leftward light-receiving sensor 14 to detect the light emission when this unit device 2 is arranged to the right viewed from the front of the unit device 2 arranged at coordinate (1, 1) (at T12). When detecting the light emission, the unit device 2 transmits its initial ID as a left light-on detection response [initial ID at (2, 1)] to notify that the unit device 2 is positioned at coordinate (2, 1) to the right of the light-emitting unit device 2 at (1, 1). The unit device 2 uses the upward light-receiving sensor 16 to detect the light emission when this unit device 2 is arranged to the bottom viewed from the front of the unit device 2 arranged at coordinate (1, 1) (at T13). When detecting the light emission, the unit device 2 transmits its initial ID as an up light-on detection response [initial ID at (1, 2)] to notify that the unit device 2 is positioned at coordinate (1, 2) beneath the light-emitting unit device 2 at (1, 1).

In the controller 4, the control unit 22 allows the wireless communication unit 24 to receive the left light-on detection response [initial ID at (2, 1)] transmitted from the unit device 2. The control unit 22 correlates the initial ID of the unit device 2 with arrangement ID (2, 1) (at S12). The control unit 22 allows the wireless communication unit 24 to receive the up light-on detection response [initial ID at (1, 2)] transmitted from the unit device 2. The control unit 22 correlates the initial ID of the unit device 2 with arrangement ID (1, 2) (at S13). The control unit 22 outputs a light-off instruction targeted at the light-emitting unit device 2 at (1, 1) as the reference position to the wireless communication unit 24. The control unit 22 allows the wireless communication unit 24 to transmit a light-off request [initial ID at (1, 1)] to the unit device 2 (at S14).

In the unit device 2, the control unit 10 allows the wireless communication unit 12 to receive the light-off request [initial ID at (1, 1)] transmitted from the controller 4. The control unit 10 turns off the light-emitting unit 8 based on the received light-off request (at T14). This stops light emission of the light-emitting unit 8 of the unit device 2 arranged at coordinate (1, 1) as the reference position.

In the controller 4, the control unit 22 outputs a light-on instruction targeted at the unit device 2 at (2, 1) correlated with arrangement ID (2, 1) to the wireless communication unit 24. The control unit 22 allows the wireless communication unit 24 to transmit a light-on request [initial ID at (2, 1)] to the unit device 2 (at S15). This turns on the light-emitting unit 8 of the unit device 2 arranged at coordinate (2, 1) (at T15). The unit device 2 uses the leftward light-receiving sensor 14 to detect the light emission (T16) when the unit device 2 is arranged to the right of the unit device 2 arranged at (2, 1) viewed from the front. The unit device 2 transmits a left light-on detection response [initial ID at (3, 1)]. The unit device 2 uses the upward light-receiving sensor 16 to detect the light emission (at T17) when the unit device 2 is arranged beneath the unit device 2 arranged at (2, 1) viewed from the front. The unit device 2 transmits an up light-on detection response [initial ID at (2, 2)].

In the controller 4, the control unit 22 allows the wireless communication unit 24 to receive the left light-on detection response [initial ID at (3, 1)] transmitted from the unit device 2. The control unit 22 correlates the initial ID of the unit device 2 with arrangement ID (3, 1) (at S16). The control unit 22 allows the wireless communication unit 24 to receive the up light-on detection response [initial ID at (2, 2)] transmitted from the unit device 2. The control unit 22 correlates the initial ID of the unit device 2 with arrangement ID (2, 2) (at S17). The control unit 22 outputs a light-off instruction targeted at the light-emitting unit device 2 corresponding to (2, 1) to the wireless communication unit 24. The control unit 22 allows the wireless communication unit 24 to transmit a light-off request [initial ID at (2, 1)] to the unit device 2 (at S18). This stops light emission of the light-emitting unit 8 of the unit device 2 arranged at coordinate (2, 1) (at T18).

In the controller 4, the control unit 22 outputs a light-on instruction targeted at the unit device 2 at (1, 2) correlated with arrangement ID (1, 2) to the wireless communication unit 24. The control unit 22 allows the wireless communication unit 24 to transmit a light-on request [initial ID at (1, 2)] to the unit device 2 (at S19). This turns on the light-emitting unit 8 of the unit device 2 arranged at the coordinate (1, 2) (at T19). The other unit device 2 is arranged beneath the unit device 2 arranged at the coordinate (1, 2) viewed from the front and uses the upward light-receiving sensor 16 to detect the light emission (at T20). The underneath unit device 2 transmits an up light-on detection response [initial ID at (1, 3)].

In the controller 4, the control unit 22 allows the wireless communication unit 24 to receive the up light-on detection response [initial ID at (1, 3)] transmitted from the unit device 2. The control unit 22 correlates the initial ID of the unit device 2 with arrangement ID (1, 3) (at S20).

As illustrated in FIG. 12, the control unit 22 sequentially controls the light-on/off conditions of the unit devices 2 horizontally and vertically from the reference position and performs the similar procedure (at S21 and T21). As illustrated in FIG. 13, the control unit 22 correlates initial IDs with arrangement IDs of all the unit devices 2 and determines arrangement IDs for all the unit devices 2. After determining arrangement IDs for all the unit devices 2, the control unit 22 outputs an arrangement ID setup instruction targeted at all the unit devices 2 to the wireless communication unit 24. The control unit 22 allows the wireless communication unit 24 to transmit an arrangement ID setup request to all the unit devices 2 (at S23).

In the unit device 2, the control unit 10 allows the wireless communication unit 12 to receive the arrangement ID setup request transmitted from the controller 4. The control unit 10 sets the arrangement ID based on the received arrangement ID setup request (at T22). The control unit 10 specifies the arrangement ID corresponding to the initial ID of the control unit 10 to set the specified arrangement ID. After setting the arrangement ID, the control unit 10 allows the wireless communication unit 12 to transmit arrangement ID setup completion to the controller 4.

A sequence of these processes enables to set the arrangement ID for each unit device 2 even if the position of the unit device 2 cannot be accurately specified in the unit device group 3. In this case, the x-coordinate and the y-coordinate contained in the arrangement ID vary in ascending order with reference to the reference position (1, 1). There has been described the reference position corresponding to the topmost and leftmost one of the two-dimensional coordinates correlated with the all the initial IDs. The reference position may be specified anywhere. Control may be provided to horizontally turn on or off the unit devices 2 from the reference position one row at a time.

(2) Second Arrangement ID Setup Process

Unlike the first arrangement ID setup process, the second arrangement ID setup process finds an absolute position without setting the reference position to set arrangement IDs for all the unit devices 2.

The controller 4 performs S31 through S37 corresponding to S1 through S7 described in the first arrangement ID setup process. The unit device 2 performs T31 through T34 corresponding to T1 through T4. As illustrated in FIG. 15, the control unit 22 correlates an initial ID with a two-dimensional coordinate $(x_{bm}, y_{bn})$, where m and n are natural numbers. Unlike two-dimensional coordinate $(x_{am}, y_{an})$ described in the first arrangement ID setup process, two-dimensional coordinate $(x_{bm}, y_{bn})$ does not decrease the accuracy and conforms to a regular sequence. The control unit 22 directly uses two-dimensional coordinates correlated with all the initial IDs for arrangement IDs to determine arrangement IDs for all the unit devices 2 (at S38). The control unit 22 outputs an arrangement ID setup instruction targeted at all the unit devices 2 to the wireless communication unit 24. The control unit 22 allows the wireless communication unit 24 to transmit an arrangement ID setup request to all the unit devices 2 (at S39).

In the unit device 2, the control unit 10 allows the wireless communication unit 12 to receive the arrangement ID setup request transmitted from the controller 4. The control unit 10 sets the arrangement ID based on the received arrangement ID setup request (at T35). The control unit 10 specifies the arrangement ID corresponding to the initial ID of the control unit 10 to set the specified arrangement ID. After setting the arrangement ID, the control unit 10 allows the wireless communication unit 12 to transmit arrangement ID setup completion to the controller 4.

A sequence of these processes enables to set the arrangement ID for each unit device 2 without setting the reference position if the position of the unit device 2 can be accurately specified in the unit device group 3.

The embodiment combines several unit devices 2 and then assigns arrangement IDs to the respective unit devices 2 in a regular sequence. The arrangement of the unit devices 2 does not require a time-consuming process of confirming position information given to the unit device 2 to be arranged. The unit devices 2 can be arranged easily. After the arrangement ID is set, the portable device 5 accepts user manipulation of entering a command as an instruction to display information such as letters or images. When receiving a control instruction from the controller 4, the unit device 2 controls the light-on/off condition of the light-emitting unit 8 based on the received control instruction and controls light transmission amounts of the filters 21a through 21c. Each of the unit devices 2 varies the state (i.e., light-on/off condition or color) based on the corresponding arrangement ID. The unit devices 2 are combined to vary the states. This enables to appropriately display information such as letters or images.

The position of the unit device 2 may not be accurately specified in the unit device group 3 because the size of the light-emitting unit 8 is relatively small or the imaging capability of the imaging unit 25 is relatively low. In such a case, the position of one of the unit devices 2 is defined as the reference position. Finding a relative position with reference to the reference position enables to set arrangement IDs for all the unit devices 2. The position of the unit device 2 may be accurately specified in the unit device group 3 because the size of the unit device group 3 is relatively large or the imaging capability of the light-emitting unit 8 is relatively high. In such a case, directly using two-dimensional coordinates correlated with all the initial IDs for arrangement IDs enables to set arrangement IDs for all the unit devices 2.

Several unit devices 2 are combined to form the unit device group 3. Not only the whole but also only part of the unit device group 3 can be used as a display screen. Any size or location can be freely selected to display information such as letters or images. Information can be displayed in various modes. The whole of the unit device group 3 can be divided into several regions. The divided regions can simultaneously display different information. One region can display a still picture and another region can display a motion picture at the same time.

When receiving a control instruction from the controller 4, the respective unit devices 2 included in the unit device group 3 can simultaneously change the state. The screen can be changed according to a method completely different from a method that changes the screen by scanning from one end (e.g., top) to the other end (e.g., bottom).

Each of the unit devices 2 operates on the wireless power supply. If any one of the unit devices 2 included in the unit device group 3 fails, only the failed unit device 2 needs to be repaired or replaced. Necessary action can be taken fast and easily. If needed, the unit device 2 can be replaced easily because no power supply wiring is required.

The disclosure is not limited to the embodiment and may be modified or enhanced. Several modifications may be combined.

The unit device may change at least two or more states based on the wireless power supply. The surface in one color (e.g., white) may be changed to the surface in another color (e.g., black) to represent a letter or an image based on a color difference. The light-emitting unit may generate a plain color. According to the described method, the unit device uses the light as a medium to detect and transmit a state change in the adjacent unit device. Sound or vibration may be used as a medium to transmit a state change.

The above describes two-dimensionally combined unit devices. The unit devices may be combined one-dimensionally (linearly) or three-dimensionally (stereoscopically). The embodiment separately provides the route to supply the power from the controller to the unit device and the route to exchange data between the controller and the unit device. However, the same route may be used. Data may be exchanged based on modulation and demodulation of a carrier wave used to supply the power from the controller to the unit device. The portable device may represent any device that just has to be capable of transmitting a command to the controller. The unit device may be configured to have any size. The wireless power supply information providing system 1 may be installed at an indoor or outdoor place.

The invention claimed is:

1. A unit device, for providing a unit device group, which includes a combination of a plurality of unit devices, the unit device comprising:
   a power receiving unit that wirelessly receives electric power from outside;

a state provision unit that selectively provides at least two states based on the electric power received by the power receiving unit;

a setup unit that sets arrangement information, indicating a position of each of the plurality of unit devices in a state where the plurality of unit devices are combined for the device group, in an alignment sequence based on arrangement information about an adjacent unit device of the unit device after configuration of the unit device group;

a storage unit that stores the arrangement information set by the setup unit; and a provision control unit that specifies a content of an information provision instruction, verifies the content of the information provision instruction with the arrangement information stored in the storage unit, and controls the state provision unit to provide one of the at least two states.

2. The unit device according to claim 1, wherein the state provision unit includes a light-emitting unit that switches between a light-on state and a light-off state.

3. The unit device according to claim 1, wherein the state provision unit further includes a display unit that switches between a plurality of colors to be displayed.

4. A wireless power supply information providing system comprising:

a unit device group configured by a plurality of unit devices, and a controller, wherein each of the plurality of unit devices including:

a power receiving unit that wirelessly receives electric power from outside;

a state provision unit that selectively provides at least two states based on the electric power received by the power receiving unit;

a setup unit that sets arrangement information, indicating a position of each of the plurality of unit devices in a state where the plurality of unit devices are combined for the unit device group after configuration of the unit device group, in an alignment sequence based on arrangement information about an adjacent unit device of one of the plurality of unit devices;

a storage unit that stores the arrangement information set by the setup unit; and a provision control unit that specifies a content of an information provision instruction, verifies the content of the information provision instruction with the arrangement information stored in the storage unit, and controls the state provision unit to provide one of the at least two states, and wherein the controller specifies a position of one of the plurality of unit devices as a reference position, determines arrangement information about all of the plurality of unit devices in an alignment sequence of relative positions with reference to arrangement information about the one of the plurality of unit devices corresponding to the reference position, and notifies determined arrangement information to each of the plurality of unit devices, and wherein each of the plurality of unit devices sets arrangement information for the unit device itself when the controller notifies the arrangement information to each of the plurality of unit devices.

5. The wireless power supply information providing system according to claim 4, wherein each of the plurality of unit devices stores specific initial information; and wherein the controller acquires a coordinate indicating a position of one of the plurality of unit devices in a state where the plurality of unit devices are combined for the unit device group, correlates the specific initial information stored in each of the plurality of unit devices with a coordinate for the one of the plurality of unit devices having notified the specific initial information, and specifies a reference position corresponding to a position where the one of the plurality of unit devices correlated with a specified coordinate is arranged.

6. The wireless power supply information providing system according to claim 5, wherein each of the plurality of unit devices notifies the specific initial information to the controller when one of the plurality of unit devices detects a state change in an adjacent unit device of the one of the plurality of unit devices; and wherein the controller sequentially changes a state of one of the plurality of unit devices from a specified reference position and, based on notification of the specific initial information from the one of the plurality of unit devices adjacent to the unit device whose state is changed, determines arrangement information about all of the plurality of unit devices in an alignment sequence of relative positions with reference to arrangement information about one of the plurality of unit devices corresponding to the specific reference position.

7. The wireless power supply information providing system according to claim 5, wherein the controller includes an imaging unit to image the unit device group, and analyzes an image imaged and acquired by the imaging unit to acquire a coordinate indicating a position of one of the plurality of unit devices in a state where the plurality of unit devices are combined for the unit device group.

8. A wireless power supply information providing system comprising:

a unit device group configured by a plurality of unit devices; and a controller, wherein each of the plurality of unit devices including:

a power receiving unit that wirelessly receives electric power from outside;

a state provision unit that selectively provides at least two states based on the electric power received by the power receiving unit;

a setup unit that sets arrangement information, indicating a position of each of the plurality of unit devices in a state where the plurality of unit devices are combined for the unit device group after configuration of the unit device group, in an alignment sequence based on arrangement information about an adjacent unit device of one of the plurality of unit devices;

a storage unit that stores the arrangement information set by the setup unit; and a provision control unit that specifies a content of an information provision instruction, verifies the content of the information provision instruction with the arrangement information stored in the storage unit, and controls the state provision unit to provide one of the at least two states, and wherein the controller determines arrangement information about all of the plurality of unit devices in an alignment sequence of absolute positions and notifies determined arrangement information to each of the plurality of unit devices, and wherein each of the plurality of unit devices sets arrangement information for the unit device itself when the controller notifies of arrangement information to each of the plurality of unit devices.

9. The wireless power supply information providing system according to claim 8, wherein each of the plurality of unit devices stores specific initial information; and wherein the controller acquires a coordinate indicating a position of one of the plurality of unit devices in a state where the plurality of unit devices are combined for the unit device group, correlates the specific initial information stored in each of the plurality of unit devices with a coordinate for the one of the plurality of unit devices having notified the specific initial information, and determines arrangement information about all of the plurality of unit devices in an alignment sequence of absolute positions.

\* \* \* \* \*